(12) United States Patent
Squires (10) Patent No.: US 10,547,683 B2
(45) Date of Patent: Jan. 28, 2020

(54) OBJECT BASED STORAGE SYSTEMS THAT UTILIZE DIRECT MEMORY ACCESS

(71) Applicant: Christopher Squires, Boulder, CO (US)

(72) Inventor: Christopher Squires, Boulder, CO (US)

( * ) Notice: Subject to any disclaimer, the term of this patent is extended or adjusted under 35 U.S.C. 154(b) by 187 days.

(21) Appl. No.: 15/632,804

(22) Filed: Jun. 26, 2017

(65) Prior Publication Data

US 2018/0375935 A1 Dec. 27, 2018

(51) Int. Cl.
*G06F 15/16* (2006.01)
*H04L 29/08* (2006.01)

(52) U.S. Cl.
CPC .............................. *H04L 67/1097* (2013.01)

(58) Field of Classification Search
CPC ................. H04L 67/1097; G06F 15/17331
USPC .................................................. 709/213
See application file for complete search history.

(56) References Cited

U.S. PATENT DOCUMENTS

| | | | | |
|---|---|---|---|---|
| 8,151,082 B2 * | 4/2012 | Flynn | ............... | G06F 3/0613 711/202 |
| 8,578,127 B2 * | 11/2013 | Thatcher | ............... | G06F 3/0604 711/103 |
| 9,122,579 B2 * | 9/2015 | Flynn | ............... | G06F 12/0246 |
| 9,208,071 B2 * | 12/2015 | Talagala | ............... | G06F 12/0246 |
| 9,563,555 B2 * | 2/2017 | Flynn | ............... | G11C 16/26 |
| 9,600,184 B2 * | 3/2017 | Flynn | ............... | G06F 3/061 |
| 9,747,319 B2 * | 8/2017 | Bestler | ............... | G06F 16/2255 |
| 9,900,397 B1 * | 2/2018 | Cope | ............... | H04L 67/2842 |
| 9,961,145 B1 * | 5/2018 | Faibish | ............... | G06F 15/167 |
| 9,977,760 B1 * | 5/2018 | Diehl | ............... | G06F 15/17331 |
| 10,003,649 B2 * | 6/2018 | Narayanan | ............... | H04L 67/1097 |
| 10,031,886 B2 * | 7/2018 | Horie | ............... | G06F 15/17331 |
| 10,063,638 B2 * | 8/2018 | Huang | ............... | H04L 29/08 |
| 10,083,193 B2 * | 9/2018 | Meng | ............... | G06F 16/2255 |
| 10,114,792 B2 * | 10/2018 | Sajeepa | ............... | G06F 15/17331 |
| 10,157,003 B1 * | 12/2018 | Faibish | ............... | G06F 3/0619 |
| 10,191,916 B1 * | 1/2019 | Faibish | ............... | H04L 67/1097 |
| 10,198,397 B2 * | 2/2019 | Fu | ............... | G06F 3/0604 |
| 10,223,326 B2 * | 3/2019 | Frank | ............... | H04L 67/40 |
| 2015/0254003 A1 * | 9/2015 | Lee | ............... | G06F 13/382 711/103 |

(Continued)

*Primary Examiner* — Melvin H Pollack
(74) *Attorney, Agent, or Firm* — Duft & Bornsen, PC (57) ABSTRACT

Embodiments describe Object-based Storage Device (OSD) targets that utilize Remote Direct Memory Access (RDMA) to allow the OSD target to directly transfer objects requested by a host system to the memory of host system, thereby bypassing an OSD interface of the host system. One embodiment comprises an OSD target that includes an OSD manager, an RDMA manager, and a non-volatile storage device that stores an object. The OSD manager communicatively couples with an OSD interface of a first host system. The RDMA manager communicatively couples with at least one of a first RDMA interface of the first host system and a second RDMA interface of a second host system. The OSD manager receives an OSD command to retrieve the object from the OSD interface, locates the object at the non-volatile storage device, and provides the object to the RDMA manager. The RDMA manager provides the object to at least one of the first RDMA interface of the first host system and the second RDMA interface of the second host system.

22 Claims, 10 Drawing Sheets

(56) References Cited

U.S. PATENT DOCUMENTS

| | | | |
|---|---|---|---|
| 2017/0255590 A1* | 9/2017 | Shuler | G06F 15/17331 |
| 2017/0295239 A1* | 10/2017 | Fang | G06F 3/0619 |
| 2018/0203866 A1* | 7/2018 | Surcouf | H04L 67/1097 |
| 2018/0288152 A1* | 10/2018 | Chagam Reddy | H04L 67/1097 |
| 2018/0316760 A1* | 11/2018 | Chernin | H04L 67/1097 |
| 2018/0349396 A1* | 12/2018 | Blagojevic | G06F 3/0659 |

* cited by examiner

OBJECT BASED STORAGE SYSTEMS THAT UTILIZE DIRECT MEMORY ACCESS

FIELD

This disclosure relates to the field of storage systems, and in particular, to object-based storage systems that utilize direct memory access.

BACKGROUND

Object-based storage is a computer data storage architecture that manages data as abstract objects, in contrast to other storage architectures such as block storage which manages data in blocks. Each object in an object-based storage architecture typically includes the data itself, metadata for the object, and a Global Unique IDentifier (GUID). Object-based storage can be implemented at the device level (e.g., object storage devices), the system level (e.g., applications that utilize objects), and the interface level (object management layers). Object storage systems generally excel at storing large amounts of unstructured data. In an object-based storage architecture, identifying individual objects is performed using the GUID.

An Object-based Storage Device (OSD) manages objects at the storage device level. An OSD organizes data as variable sized objects, rather than as fixed sized blocks. Each object includes data as a sequence of bytes and may include metadata which describes the object. OSD interfaces at the client level includes commands to create and delete objects, write bytes and read bytes to and from individual objects, and may have the ability to set and get attributes (e.g., access the metadata) on objects. Since objects are managed with a GUID, the OSD interacts with a host system using the GUID rather than at the block level. This abstraction allows the host system to be ambivalent regarding where or how an object is actually stored by an OSD.

When a host system is tasked with storing an object at an OSD, the host system provides the OSD with the object and a GUID. The OSD stores the object at persistent storage and internally references the data for the object with the GUID. When the host system is tasked with retrieving the object, the host system provides the GUID to the OSD. The OSD uses the GUID to identify where the object is stored at persistent storage, retrieves the object from the persistent storage, and provides the object to the host system (e.g., over a network). The host system then places the object in local memory to allow applications executing on the host system to interact with the object.

While object-based storage is efficient in abstracting the storage-level details from applications executing on the host system, object-based storage still relies on the host system to transfer objects from the OSD across the network and into local memory of the host system. This overhead may be detrimental to the performance of the host system, due to the processing overhead that the host system undertakes to perform this task. It therefore is desirable to enable the object-based storage architecture to operate more efficiently, while retaining the benefits of abstraction that are inherent in object-based storage architectures.

SUMMARY

Embodiments describe Object-based Storage Device (OSD) targets that utilize Remote Direct Memory Access (RDMA) to allow the OSD target to directly transfer objects requested by a host system to the memory of host system, thereby bypassing an OSD interface of the host system.

One embodiment comprises an Object-based Storage Device (OSD) target that includes an OSD manager, a Remote Direct Memory Access (RDMA) manager, and a non-volatile storage device. The OSD manager communicatively couples with an OSD interface of a first host system. The RDMA manager communicatively couples with at least one of a first RDMA interface of the first host system and a second RDMA interface of a second host system. The non-volatile storage device stores an object. The OSD manager receives an OSD command to retrieve the object from the OSD interface, locates the object at the non-volatile storage device, and provides the object to the RDMA manager. The RDMA manager provides the object to at least one of the first RDMA interface of the first host system and the second RDMA interface of the second host system.

Another embodiment comprises a method operable by an Object-based Storage Device (OSD) target that includes an OSD manager that to communicatively couples with an OSD interface of a first host system, a Remote Direct Memory Access (RDMA) manager that communicatively couples with at least one of a first RDMA interface of the first host system and a second RDMA interface of a second host system, and a non-volatile storage device that stores an object. The method comprises receiving, by the OSD manager, an OSD command from the OSD interface to retrieve an object. The method further comprises locating, by the OSD manager, the object at the non-volatile storage device. The method further comprises providing, by the OSD manager, the object to the RDMA manager. The method further comprises providing, by the RDMA manager, the object to at least one of the first RDMA interface of the first host system and the second RDMA interface of the second host system.

Another embodiment comprises a host system. The host system includes an Object-based Storage Device (OSD) interface that communicatively couples with an OSD manager of an OSD target, a Remote Direct Memory Access (RDMA) interface that communicatively couples with an RDMA manager of the OSD target, and a memory. The OSD interface transmits an OSD command to the OSD manager to return an object from the OSD target. The RDMA interface receives the object from the RDMA manager of the OSD target, and places the object in the memory.

Another embodiment comprises a method operable by a host system that includes an Object-based Storage Device (OSD) interface that communicatively couples with an OSD manager of an OSD target, a Remote Direct Memory Access (RDMA) interface that communicatively couples with an RDMA manager of the OSD target, and a memory. The method comprises transmitting, by the OSD interface, an OSD command to the OSD manager to retrieve an object from the OSD target. The method further comprises providing, by the OSD manager, the memory address to the RDMA manager. The method further comprises directing, by the RDMA manager, the second RDMA interface of the second host system to place the object in the memory of the second host system based on the memory address.

In another embodiment, a system includes a first host system and a second host system. The first host system has an Object-based Storage Device (OSD) interface that communicatively couples with an OSD manager of an OSD target. The second host system includes a Remote Direct Memory Access (RDMA) interface that communicatively couples with an RDMA manager of the OSD target, and a memory. The OSD interface transmits an OSD command to the OSD manager to place an object from the OSD target in the memory. The RDMA interface receives the object from the RDMA manager of the OSD target, and places the object in the memory Another embodiment comprises a method operable by a system that includes a first host system having an Object-based Storage Device (OSD) interface that communicatively couples with an OSD manager of an OSD target, and second host system including a Remote Direct Memory Access (RDMA) interface that communicatively couples with an RDMA manager of the OSD target and a memory. The method comprises transmitting, by the OSD interface, an OSD command to the OSD manager to place an object from the OSD target in the memory. The method further comprises receiving, by the RDMA interface, the object from the RDMA manager of the OSD target. The method further comprises placing, by the RDMA interface, the object in the memory.

The above summary provides a basic understanding of some aspects of the specification. This summary is not an extensive overview of the specification. It is intended to neither identify key or critical elements of the specification nor delineate any scope particular embodiments of the specification, or any scope of the claims. Its sole purpose is to present some concepts of the specification in a simplified form as a prelude to the more detailed description that is presented later.

DESCRIPTION OF THE DRAWINGS

Some embodiments are now described, by way of example only, and with reference to the accompanying drawings. The same reference number represents the same element or the same type of element on all drawings.

DESCRIPTION

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
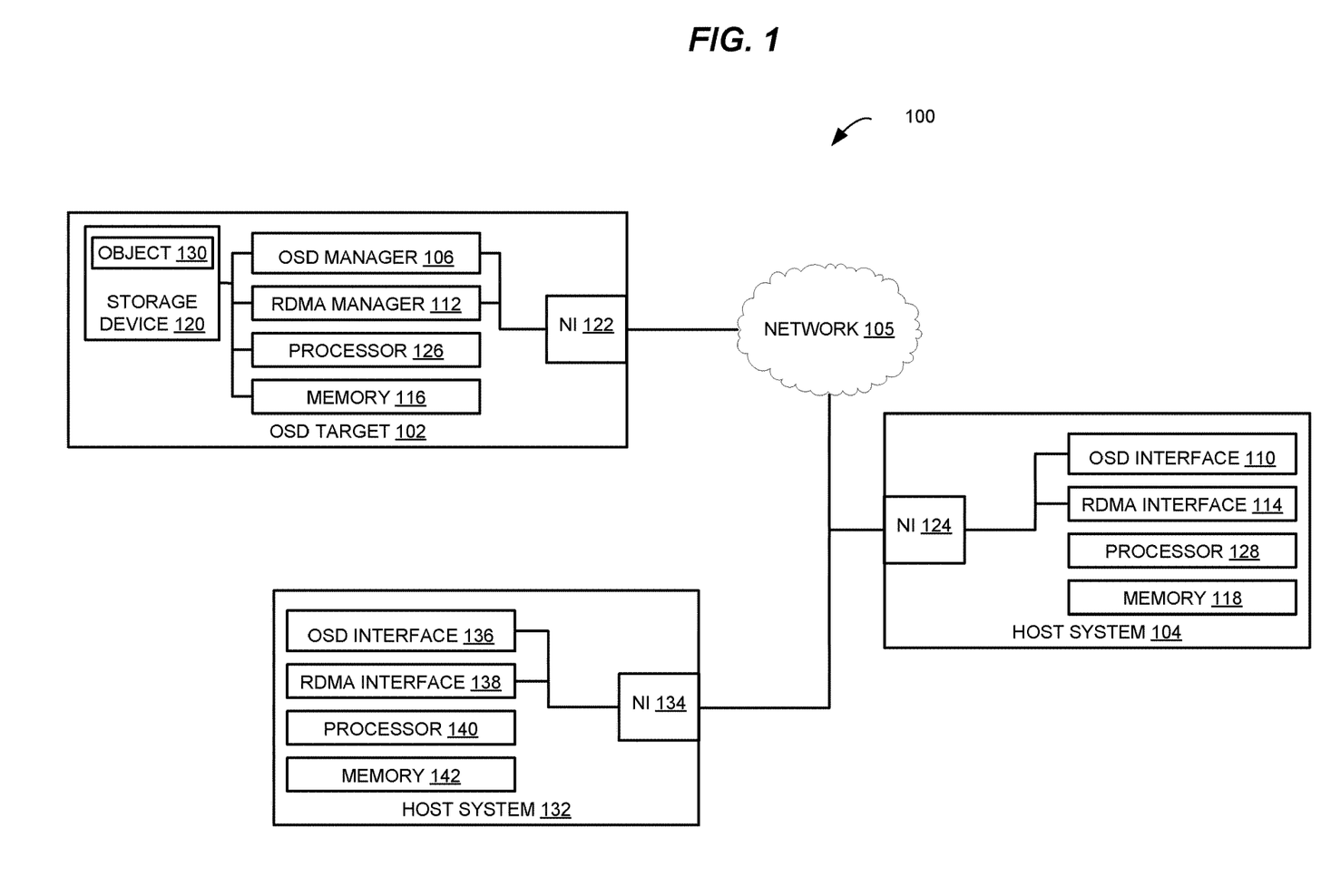
FIG. 1 illustrates an object-based storage system that utilizes RDMA in an exemplary embodiment.

FIG. 1 illustrates an object-based storage system 100 that utilizes RDMA in an exemplary embodiment. In FIG. 1, object-based storage system 100 includes an OSD target 102 that communicates with a host system 104 and/or host system 132 via a network 105. In this embodiment, OSD target 102 includes an OSD manager 106, which is able to communicate with an OSD interface 110 of host system 104 and/or an OSD interface 136 of host system 132 over network 105. OSD manager 106, OSD interface 110, and OSD interface 136 utilize OSD commands to manipulate objects. For example, host system 104 may utilize OSD interface 110 to transmit an OSD read command to OSD manager 106 along with a GUID for an object, which directs OSD target 102 to return an object corresponding to the GUID to host system 104.

In this embodiment, OSD target 102 further includes an RDMA manager 112, which is able to communicate with an RDMA interface 114 of host system 104 and/or an RDMA interface 138 of host system 132 over network 105. RDMA is a direct memory transfer architecture, which allows computers to directly transfer data from the host memory of one computer to the host memory of another computer with minimal or no interaction of the operating systems at either host. RDMA manager 112, RDMA interface 114, and RDMA interface 138 utilize the RDMA protocol to transfer objects between a memory 116 of OSD target 102 to a memory 118 of host system 104 and/or a memory 142 of host system 132.

For example, in response to OSD manager 106 receiving an OSD read command from OSD interface 110 of host system 104, OSD target 102 may utilize RDMA manager 112 to provide the object to RDMA interface 114 of host system 104, thereby bypassing OSD interface 110 of host system 104. In particular, RDMA is used by OSD target 102 to directly transfer an object from memory 116 of OSD target 102 to memory 118 of host system 104 and/or to memory 142 of host system 132, which is more efficient than transferring the object to host system 104 and/or host system 132 using OSD interface 110 and/or OSD interface 136.

When a storage system receives an OSD read command from a requestor to retrieve an object, the storage system responds to the request and transmits the object back to the requestor using OSD commands. The OSD interface of the requestor receives the object and places it in local memory. This process can generate processing overhead, which is handled by the requestor. Although this overhead may be minimal for a single OSD read request, multiple concurrent OSD read requests results in a larger processing burden for the requestor of the object, since the local OS of the requestor is involved in the transfer process.

In this embodiment, OSD target 102 includes at least one storage device 120, which persistently stores data for OSD target 102. Storage device 120 includes one or more non-volatile Dynamic Random-Access Memory (DRAM) devices, FLASH devices, non-volatile Static RAM devices, magnetic disk drives, Solid State Disks (SSDs), etc. Some examples of non-volatile DRAM and SRAM include battery-backed DRAM and battery-backed SRAM.

In this embodiment, OSD target 102 also includes network interface 122. Network interface 122 may include hardware, software, or combinations of hardware and software that are able to provide communication capabilities between OSD target 102 and network 105. Some examples of networks include Ethernet networks, 802.11 wireless networks, Fiber Channel networks, InfiniBand networks, etc.

In this embodiment, host system 104 also includes a network interface 124, which may have similar capabilities as network interface 122 of OSD target 102. Host system 132 includes a network interface 134, which may have similar capabilities as network interface 122 of OSD target 102.

While the specific hardware implementation of OSD target 102, host system 104, and host system 132 are subject to design choices, one particular embodiment for OSD target 102 may include one or more processors 126 communicatively coupled with memory 116, one particular embodiment for host system 104 may include one or more processors 128 communicatively coupled with memory 118, and one particular embodiment for host system 132 may include one or more processors 140 communicatively coupled with memory 142. Processor 126, processor 128, and processor 140 may include any electronic circuits and/or optical circuits that are able to perform functions. For example, processor 126 may perform any functionality described herein OSD manager 106 and/or RDMA manager 112, processor 128 may perform any functionality described herein for OSD interface 110 and/or RDMA interface 114, and processor 140 may perform any functionality described herein for OSD interface 136 and/or RDMA interface 138. Processor 126, processor 128, and processor 140 may include one or more Central Processing Units (CPU), microprocessors, Digital Signal Processors (DSPs), Application-specific Integrated Circuits (ASICs), Programmable Logic Devices (PLD), control circuitry, etc. Some examples of processors include INTEL® CORE™ processors, Advanced Reduced Instruction Set Computing Machines (ARM®) processors, etc.

Memory 116 of OSD target 102, memory 118 of host system 104, and memory 142 of host system 132 may include any electronic circuits, and/or optical circuits, and/or magnetic circuits that are able to store data. Memory 116 may store instructions that execute on processor 126, memory 118 may store instructions that execute on processor 128, and memory 142 may store instructions that execute on processor 140. Memory 116, memory 118, and memory 142 may include one or more volatile or non-volatile Dynamic Random Access Memory (DRAM) devices, FLASH devices, volatile or non-volatile Static RAM devices, magnetic disk drives, Solid State Disks (SSDs), etc. Some examples of non-volatile DRAM and SRAM include battery-backed DRAM and battery-backed SRAM.

Figure 2:
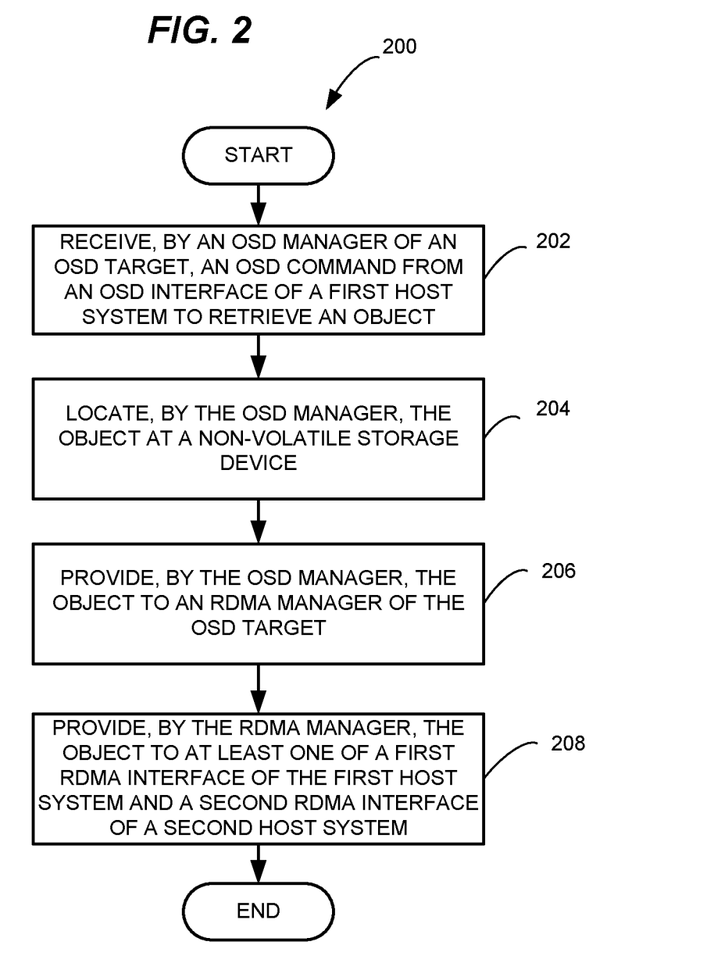
FIG. 2 is a flow chart of a method operable by an OSD target in an exemplary embodiment.

Consider that object-based storage system 100 is operational and OSD target 102 is currently storing object 130 at storage device 120. FIG. 2 is a flow chart of a method 200 operable by an OSD target in an exemplary embodiment. The methods described herein will be discussed with respect to object-based storage system 100 of FIG. 1, although the methods may be performed by other systems, not shown. The methods may include other steps, not shown. Also, the steps may be performed in an alternate order.

OSD manager 106 receives an OSD command from OSD interface 110 of host system 104 to retrieve object 130 (see step 202). For example, host system 104 may utilize OSD interface 110 to transmit an OSD read command to OSD target 102. OSD manager 106 locates object 130 at storage device 120 (see step 204).

OSD manager 106 provides object 130 to RDMA manager 112 (see step 206). RDMA manager 112 provides object 130 to at least one of RDMA interface 114 of host system 104 and RDMA interface 138 of host system 132 (see step 208). If object 130 is provided to RDMA interface 114 of host system 104, then RDMA interface 114 places object 130 in memory 116. If object 130 is provided to RDMA interface 138 of host system 132, then RDMA interface 138 places object 130 in memory 142.

Figure 3:
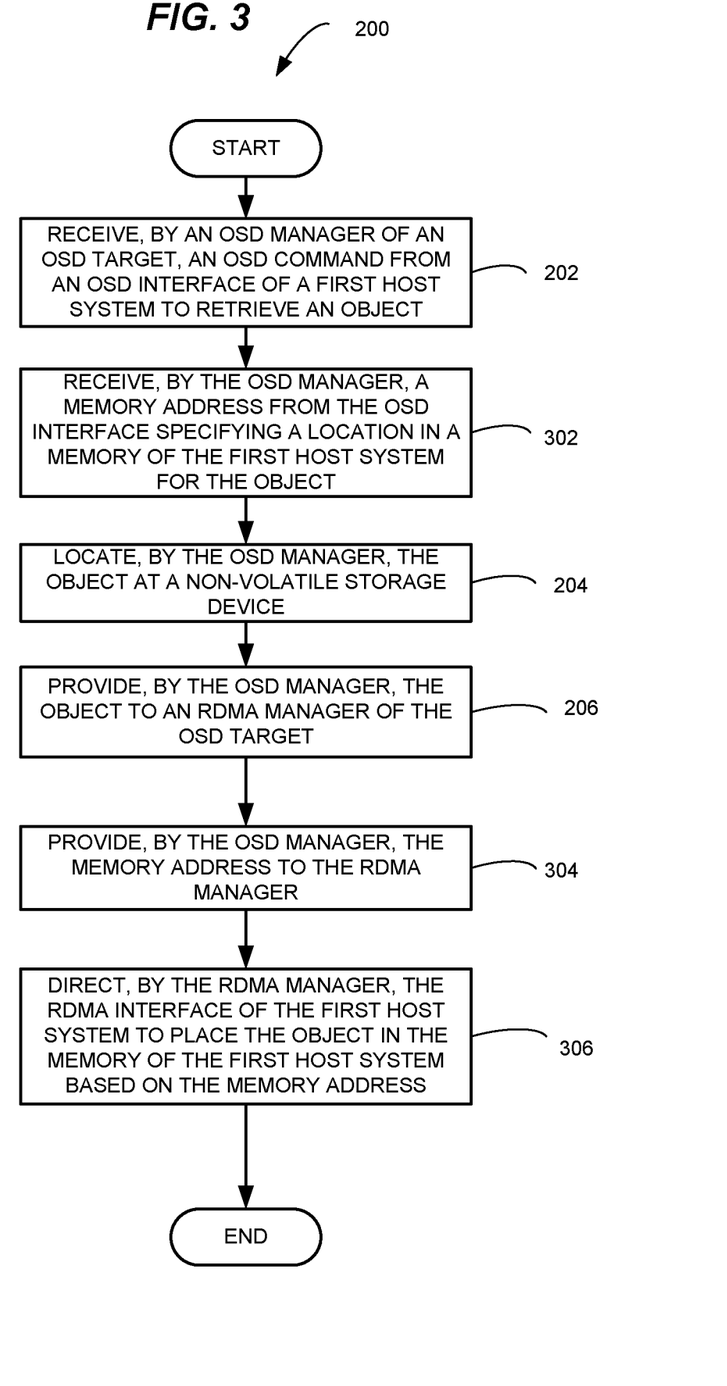
FIGS. 3-4 illustrate additional optional steps of the method of FIG. 2 in exemplary embodiments.
Figure 4:
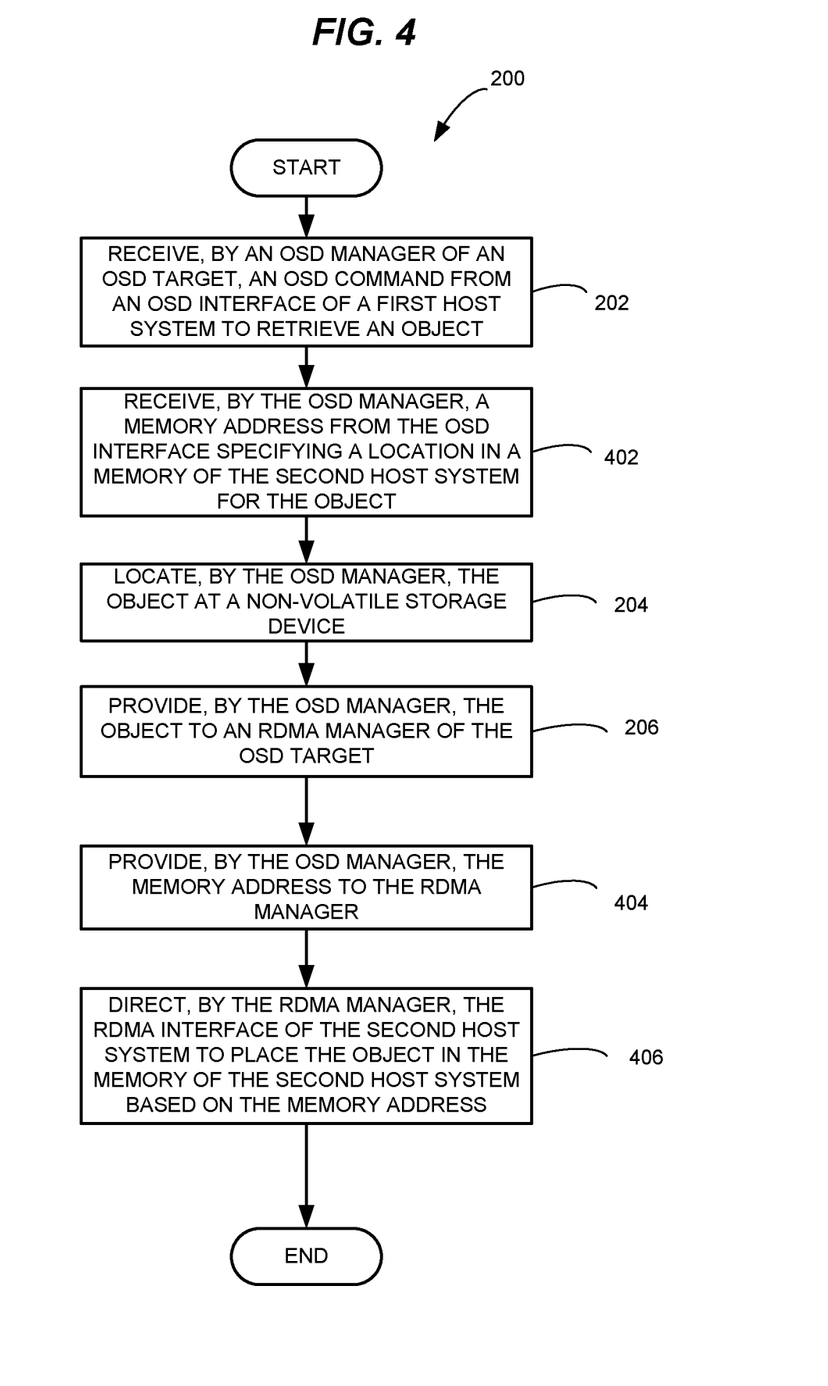

FIGS. 3-4 illustrate additional optional steps of method 200 in exemplary embodiments. FIG. 3 describes an embodiment whereby object 130 is placed at a location in memory 118 of host system 104. OSD manager 106 receives an OSD command from OSD interface 110 of host system 104 to retrieve object 130 (see step 202 of FIG. 2). OSD manager 106 also receives a memory address from OSD interface 110 specifying a location in memory 118 of host system 104 for object 130 (see step 302 of FIG. 3). OSD manager 106 locates object 130 at storage device 120 (see step 204 of FIG. 2). OSD manager 106 provides object 130 to RDMA manager 112 (see step 206 of FIG. 2). OSD manager 106 also provides the memory address of a location in memory 118 for object 130 to RDMA manager 112 (see step 304 of FIG. 3). RDMA manager 112 then directs RDMA interface 114 of host system 104 to place object 130 at a location in memory 118 based on the memory address (see step 306 of FIG. 3).

FIG. 4 describes an embodiment whereby object 130 is placed at a location in memory 142 of host system 132. OSD manager 106 receives an OSD command from OSD interface 110 of host system 104 to retrieve object 130 (see step 202 of FIG. 2). OSD manager 106 also receives a memory address from OSD interface 110 specifying a location in memory 142 of host system 132 for object 130 (see step 402 of FIG. 4). OSD manager 106 locates object 130 at storage device 120 (see step 204 of FIG. 2). OSD manager 106 provides object 130 to RDMA manager 112 (see step 206 of FIG. 2). OSD manager 106 also provides the memory address of a location in memory 142 for object to RDMA manager 112 (see step 404 of FIG. 4). RDMA manager 112 then directs RDMA interface 138 of host system 132 to place object 130 at a location in memory 142 based on the memory address (see step 406 of FIG. 4).

Figure 5:
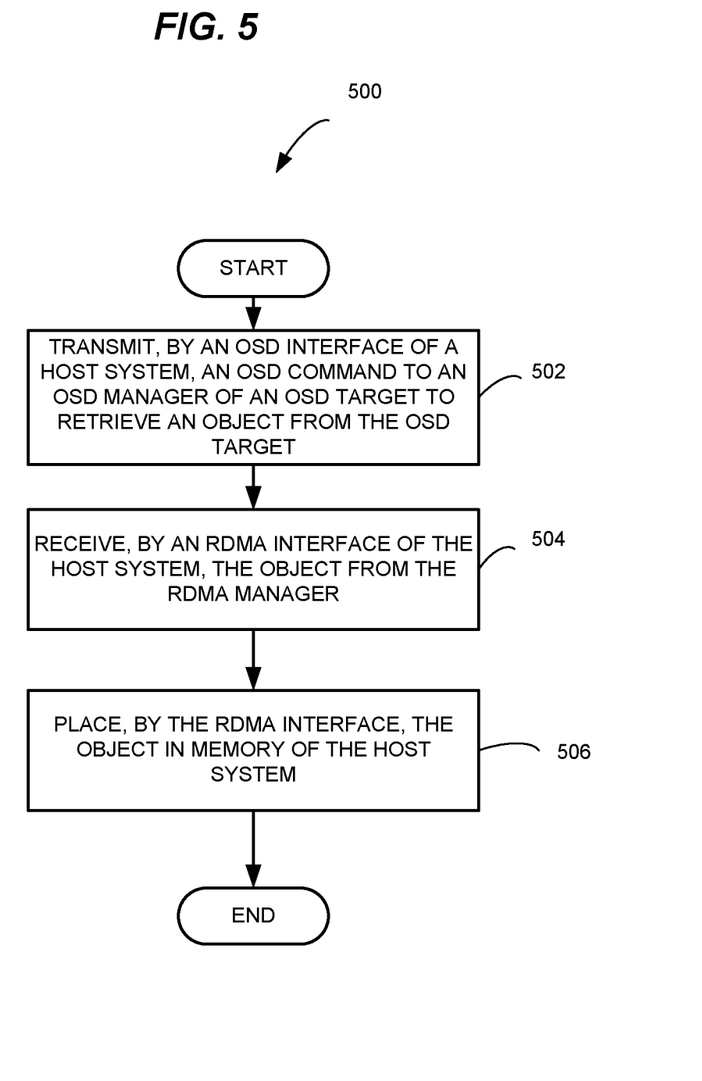
FIG. 5 illustrates a method operable by a host system in an exemplary embodiment.

FIG. 5 is a flow chart of a method 500 operable by a host system in an exemplary embodiment. Method 500 relates to activities performed by host system 104 and/or host system 132 to retrieve object 130 from OSD target 102. For instance, OSD interface 110 of host system 104 may transmit an OSD command to OSD manager 106 to retrieve object 130 from OSD target 102 (see step 502). For instance, an application executing on host system 104 may generate a read request for object 130, which is transmitted to OSD interface 110 to OSD target 102. RDMA interface 114 of host system 104 receives object 130 from RDMA manager 112 of OSD target 102 (see step 504). RDMA interface 114 places object 130 at a location in memory 118 of host system 104 (see step 506).

Figure 6:
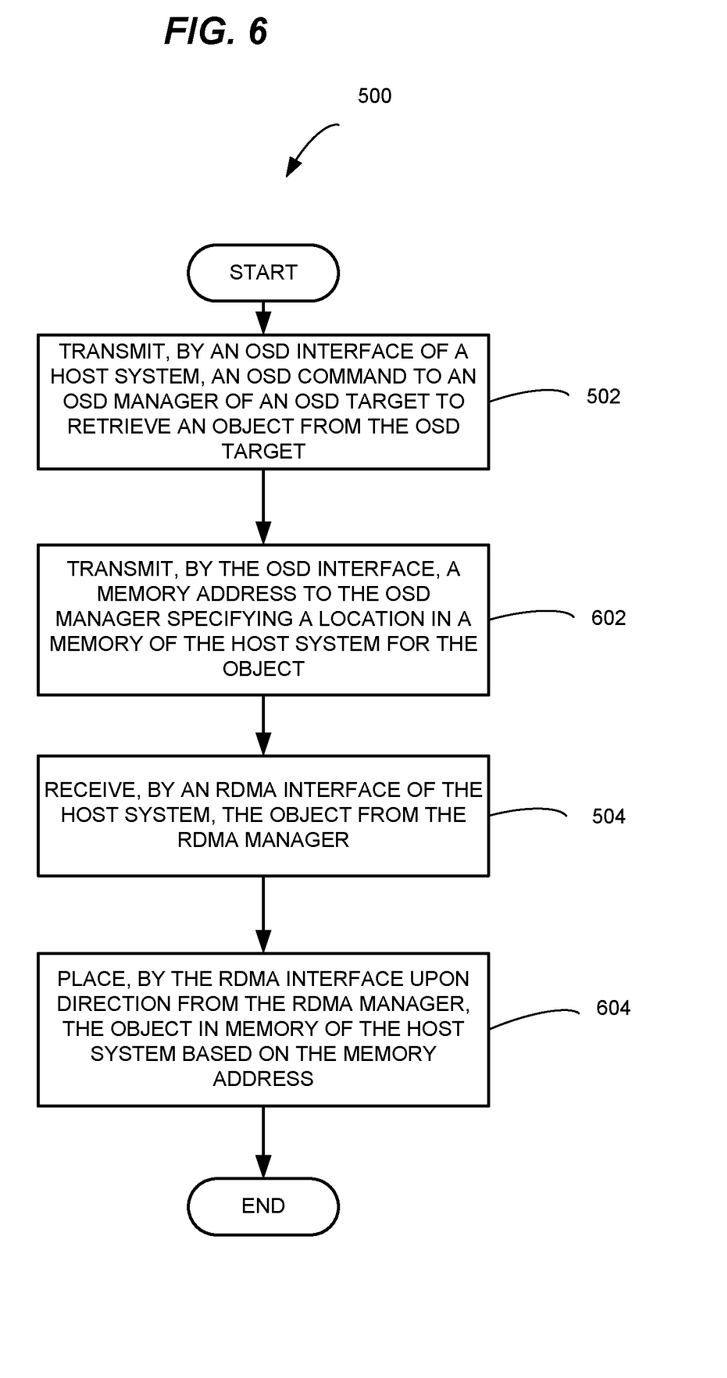
FIGS. 6-7 illustrate additional optional steps of the method of FIG. 5 in exemplary embodiments.
Figure 7:
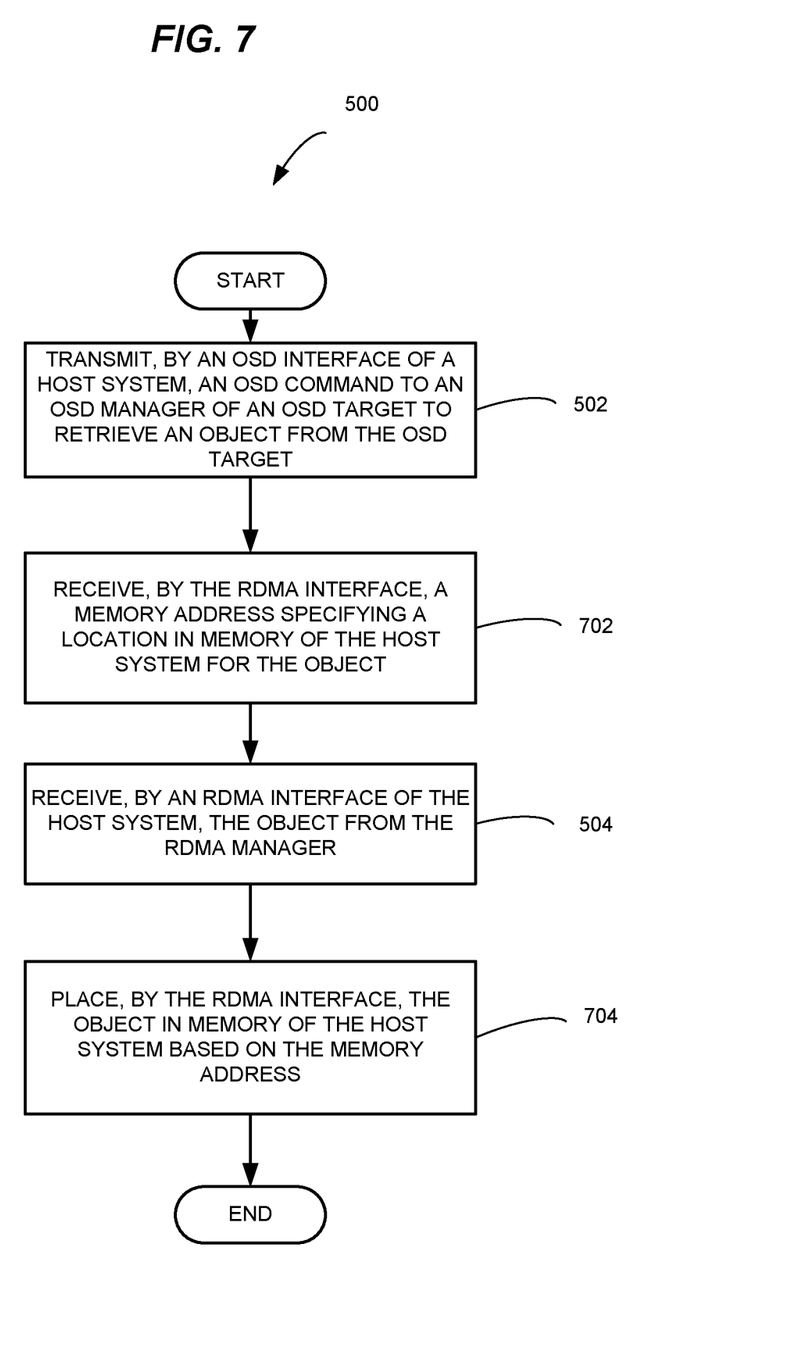

FIGS. 6-7 illustrates additional optional steps of method 500 in an exemplary embodiment. FIG. 6 describes an embodiment whereby object 130 is placed at a location in memory 118 of host system 104 when OSD target 102 receives a memory address for object 130 from host system 104. OSD interface 110 of host system 104 transmits an OSD command to OSD manager 106 to retrieve object 130 from OSD target 102 (see step 502 of FIG. 5). OSD interface 110 also transmits a memory address to OSD manager 106 specifying a location in memory 118 of host system 104 for object 130 (see step 602 of FIG. 6). RDMA interface 114 of host system 104 receives object 130 from RDMA manager 112 of OSD target 102 (see step 504). RDMA interface 114, at the direction of RDMA manager 112, places object 130 in a location in memory 118 of host system 104 based on the memory address (see step 604 of FIG. 6).

FIG. 7 describes an embodiment whereby object 130 is placed at a location in memory 118 of host system 104 when OSD target 102 does not receive a memory address for object 130 from host system 104. OSD interface 110 of host system 104 transmits an OSD command to OSD manager 106 to retrieve object 130 from OSD target 102 (see step 502 of FIG. 5). RDMA interface 114 of host system 104 receives a memory address specifying a location in memory 118 for object 130 (e.g., from an application executing on host system 104, see step 702 of FIG. 7). RDMA interface 114 of host system 104 receives object 130 from RDMA manager 112 of OSD target 102 (see step 504 of FIG. 5). RDMA interface 114 places object 130 at a location in memory 118 based on the memory address (see step 704 of FIG. 7).

Figure 8:
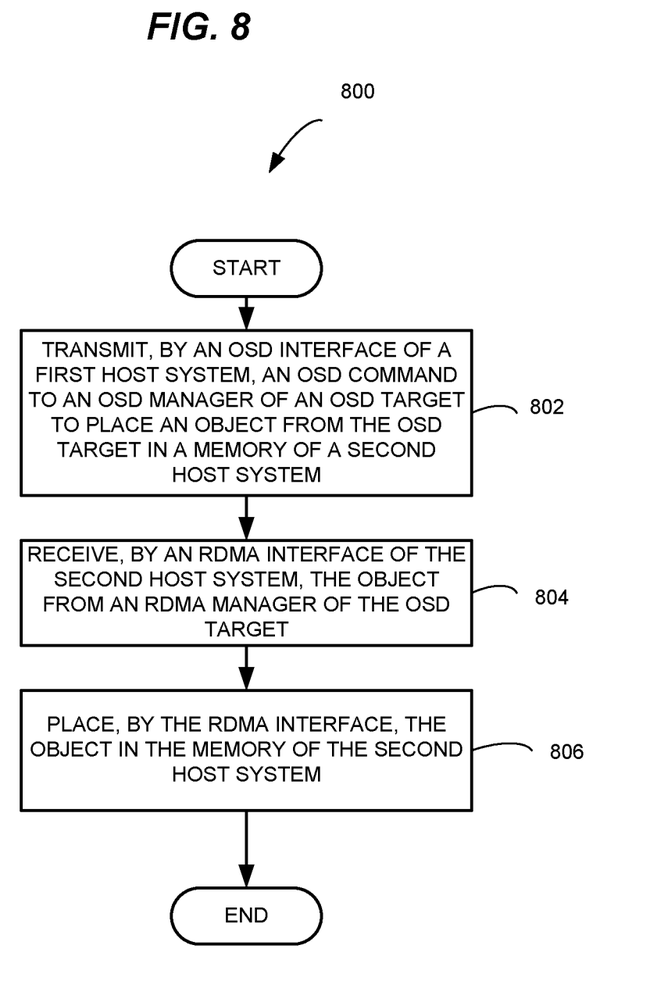
FIG. 8 illustrates a method operable by a host system in another exemplary embodiment.

FIG. 8 illustrates a method 800 operable by host system 104 in another exemplary embodiment. In particular, method 800 describes whereby host system 104 requests that OSD target 102 place object 130 in memory 142 of host system 132, rather than having OSD target 102 place object 130 in memory 118 of host system 104.

OSD interface 110 of host system 104 transmits an OSD command to OSD manager 106 of OSD target 102 to place object 130 into memory 142 of host system 132 (see step 802 of FIG. 8). RDMA interface 138 of host system 132 receives object 130 from RDMA manager 112 of OSD target 102 (see step 804 of FIG. 8). RDMA interface 138 of host system 132 places object 130 in memory 142 of host system 132 (see step 806 of FIG. 8).

Figure 9:
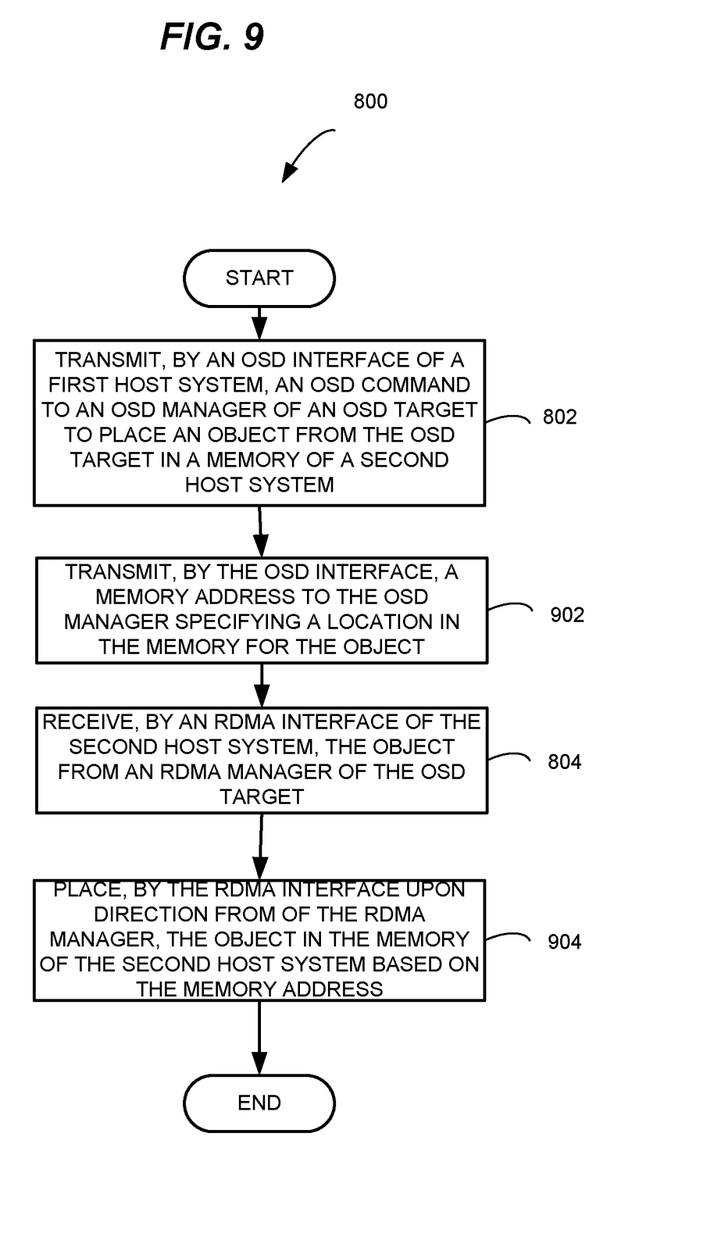
FIGS. 9-10 illustrate additional optional steps of the method of FIG. 8 in exemplary embodiments.
Figure 10:
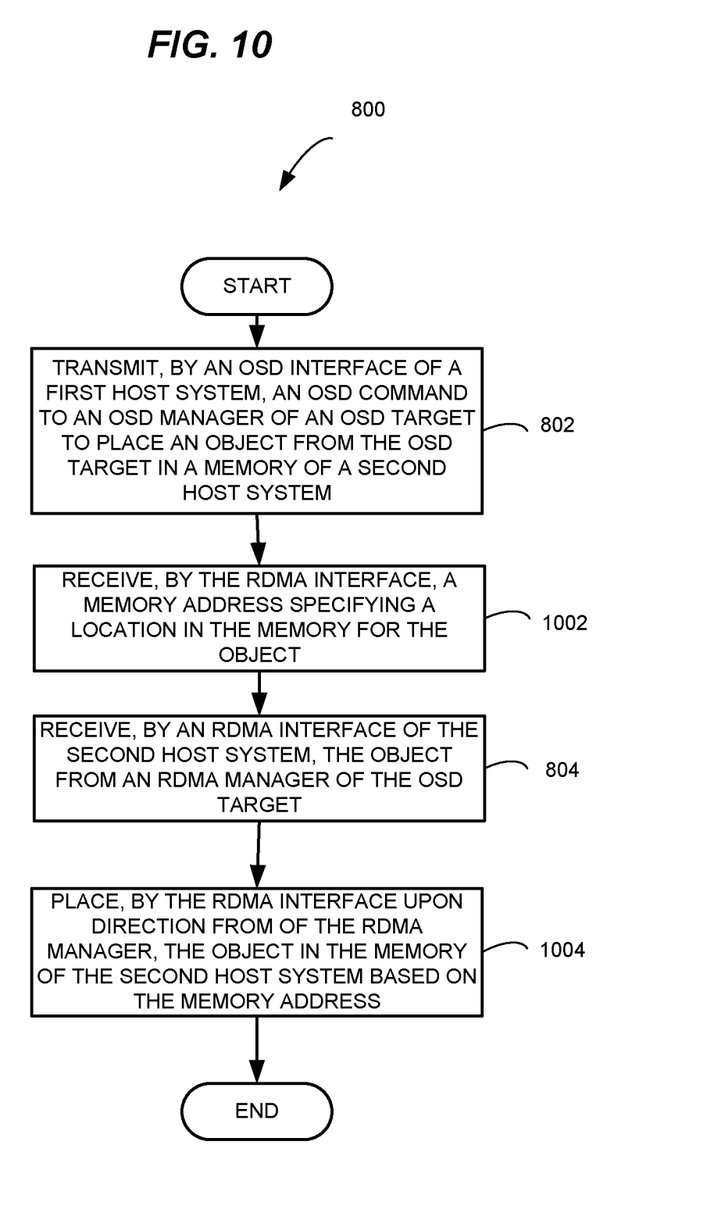

FIGS. 9-10 illustrate additional optional steps of method 800 of FIG. 8 in exemplary embodiments. FIG. 9 describes an embodiment whereby object 130 is placed at a location in memory 142 of host system 132 when OSD target 102 receives a memory address for object 130 from host system 104. OSD interface 110 of host system 104 transmits an OSD command to OSD manager 106 of OSD target 102 to place object 130 into memory 142 of host system 132 (see step 802 of FIG. 8). OSD interface 110 also transmits a memory address to OSD manager 106 specifying a location in memory 142 of host system 132 for object 130 (see step 902 of FIG. 9). RDMA interface 138 of host system 132 receives object 130 from RDMA manager 112 of OSD target 102 (see step 804 of FIG. 8). RDMA interface 138, at the direction of RDMA manager 112, places object 130 in a location in memory 142 of host system 132 based on the memory address (see step 904 of FIG. 9).

FIG. 10 describes an embodiment whereby object 130 is placed at a location in memory 142 of host system 132 when OSD target 102 does not receive a memory address for object 130 from host system 104. OSD interface 110 of host system 104 transmits an OSD command to OSD manager 106 of OSD target 102 to place object 130 into memory 142 of host system 132 (see step 802 of FIG. 8). RDMA interface 138 receives a memory address specifying a location in memory 142 for object 130 (e.g., from an application executing on host system 104, see step 1002). RDMA interface 138 of host system 132 receives object 130 from RDMA manager 112 of OSD target 102 (see step 804 of FIG. 8). RDMA interface 138, at the direction of RDMA manager 112, places object 130 in a location in memory 142 of host system 132 based on the memory address (see step 1004 of FIG. 10).

While object-based storage systems are capable of providing abstracted object storage, they are inefficient in object retrieval because the OS of the host system is tasked with completing the transfer of objects to local memory of the host system. The use of RDMA at an OSD target enables direct memory transfer of object from storage to memory of the host system, which reduces the burden on the host system during read operations.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" may implicitly include, without limitation, digital signal processor (DSP) hardware, a network processor hardware, application specific integrated circuit (ASIC) hardware or other hardware circuitry, field programmable gate array (FPGA) hardware, or some other physical hardware component.

Also, the functionality described herein may be implemented as instructions executable by a processor or a computer to perform the functions. Some examples of instructions are software, program code, and firmware. The instructions are operational when executed by the processor to direct the processor to perform the functions. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope is not limited to those specific embodiments. Rather, the scope is defined by the following claims and any equivalents thereof.

What is claimed is:

1. An Object-based Storage Device (OSD) target comprising:
   an OSD manager configured to communicatively couple with an OSD interface of a first host system;
   a Remote Direct Memory Access (RDMA) manager configured to communicatively couple with at least one of a first RDMA interface of the first host system and a second RDMA interface of a second host system; and
   a non-volatile storage device configured to store an object defined in an Object-based Storage architecture,
   wherein the OSD manager is configured to receive an OSD command to retrieve the object from the OSD interface, to locate the object at the non-volatile storage device, and to provide the object to the RDMA manager,
   wherein the RDMA manager is configured to provide the object to at least one of the first RDMA interface of the first host system and the second RDMA interface of the second host system.

2. The OSD target of claim 1, wherein:
   the RDMA manager is configured to provide the object to the first RDMA interface of the first host system.

3. The OSD target of claim 2, wherein:
   the OSD manager is configured to receive a memory address from the OSD interface specifying a location in a memory of the first host system for the object, and to provide the memory address to the RDMA manager; and
   the RDMA manager is configured to direct the first RDMA interface of the first host system to place the object in the memory of the first host system based on the memory address.

4. The OSD target of claim 1, wherein:
   the RDMA manager is configured to provide the object to the second RDMA interface of the second host system.

5. The OSD target of claim 4, wherein:
the OSD manager is configured to receive a memory address from the OSD interface specifying a location in a memory of the second host system for the object, and to provide the memory address to the RDMA manager; and
the RDMA manager is configured to direct the second RDMA interface of the second host system to place the object in the memory of the second host system based on the memory address.

6. A method operable by an Object-based Storage Device (OSD) target that includes an OSD manager configured to communicatively couple with an OSD interface of a first host system, a Remote Direct Memory Access (RDMA) manager configured to communicatively couple with at least one of a first RDMA interface of the first host system and a second RDMA interface of a second host system, and a non-volatile storage device configured to store an object, the method comprising:
receiving, by the OSD manager, an OSD command from the OSD interface to retrieve an object defined in an Object-based Storage architecture;
locating, by the OSD manager, the object at the non-volatile storage device;
providing, by the OSD manager, the object to the RDMA manager; and
providing, by the RDMA manager, the object to at least one of the first RDMA interface of the first host system and the second RDMA interface of the second host system.

7. The method of claim 6, wherein providing the object to at least one of the first RDMA interface of the first host system and the second RDMA interface of the second host system further comprises:
providing the object to the first RDMA interface of the first host system.

8. The method of claim 7, further comprising:
receiving, by the OSD manager, a memory address from the OSD interface specifying a location in a memory of the first host system for the object;
providing, by the OSD manager, the memory address to the RDMA manager; and
directing, by the RDMA manager, the first RDMA interface of the first host system to place the object in the memory of the first host system based on the memory address.

9. The method of claim 6, wherein providing the object to at least one of the first RDMA interface of the first host system and the second RDMA interface of the second host system further comprises:
providing the object to the second RDMA interface of the second host system.

10. The method of claim 9, further comprising:
receiving, by the OSD manager, a memory address from the OSD interface specifying a location in a memory of the second host system for the object;
providing, by the OSD manager, the memory address to the RDMA manager; and
directing, by the RDMA manager, the second RDMA interface of the second host system to place the object in the memory of the second host system based on the memory address.

11. A host system comprising:
an Object-based Storage Device (OSD) interface configured to communicatively couple with an OSD manager of an OSD target;
a Remote Direct Memory Access (RDMA) interface configured to communicatively couple with an RDMA manager of the OSD target; and
a memory,
wherein the OSD interface is configured to transmit an OSD command to the OSD manager to return an object defined in an Object-based Storage architecture from the OSD target,
wherein the RDMA interface is configured to receive the object from the RDMA manager of the OSD target, and to place the object in the memory.

12. The host system of claim 11, wherein:
the OSD interface is configured to transmit a memory address to the OSD manager specifying a location in the memory for the object,
the RDMA interface is configured to place the object in the memory based on the memory address upon direction from the RDMA manager.

13. The host system of claim 11, wherein:
the RDMA interface is configured to receive a memory address specifying a location in the memory for the object, and to place the object in the memory based on the memory address.

14. A method operable by a host system that includes an Object-based Storage Device (OSD) interface configured to communicatively couple with an OSD manager of an OSD target, a Remote Direct Memory Access (RDMA) interface configured to communicatively couple with an RDMA manager of the OSD target, and a memory, the method comprising:
transmitting, by the OSD interface, an OSD command to the OSD manager to retrieve an object defined in an Object-based Storage architecture from the OSD target;
receiving, by the RDMA interface, the object from the RDMA manager of the OSD target; and
placing, by the RDMA interface, the object in the memory.

15. The method of claim 14, further comprising:
transmitting, by the OSD interface, a memory address to the OSD manager specifying a location in the memory for the object; and
placing, by the RDMA interface upon direction from the RDMA manager, the object in the memory based on the memory address.

16. The method of claim 14, further comprising:
receiving, by the RDMA interface, a memory address specifying a location in the memory for the object; and
placing, by the RDMA interface, the object in the memory based on the memory address.

17. A system comprising:
a first host system having an Object-based Storage Device (OSD) interface configured to communicatively couple with an OSD manager of an OSD target; and
a second host system, including:
a Remote Direct Memory Access (RDMA) interface configured to communicatively couple with an RDMA manager of the OSD target; and
a memory,
wherein the OSD interface is configured to transmit an OSD command to the OSD manager to place an object defined in an Object-based Storage architecture from the OSD target in the memory,
wherein the RDMA interface is configured to receive the object from the RDMA manager of the OSD target, and to place the object in the memory.

18. The system of claim 17, wherein:
the OSD interface is configured to transmit a memory address to the OSD manager specifying a location in the memory for the object,
the RDMA interface is configured to place the object in the memory based on the memory address upon direction from the RDMA manager.

19. The system of claim 17, wherein:
the RDMA interface is configured to receive a memory address specifying a location in the memory for the object, and to place the object in the memory based on the memory address.

20. A method operable by a system that includes a first host system having an Object-based Storage Device (OSD) interface configured to communicatively couple with an OSD manager of an OSD target, and second host system including a Remote Direct Memory Access (RDMA) interface configured to communicatively couple with an RDMA manager of the OSD target and a memory, the method comprising:

transmitting, by the OSD interface, an OSD command to the OSD manager to place an object defined in an Object-based Storage architecture from the OSD target in the memory;
receiving, by the RDMA interface, the object from the RDMA manager of the OSD target; and
placing, by the RDMA interface, the object in the memory.

21. The method of claim 20, further comprising:
transmitting, by the OSD interface, a memory address to the OSD manager specifying a location in the memory for the object; and
placing, by the RDMA interface upon direction from the RDMA manager, the object in the memory based on the memory address.

22. The method of claim 20, further comprising:
receiving, by the RDMA interface, a memory address specifying a location in the memory for the object; and
placing, by the RDMA interface, the object in the memory based on the memory address.

* * * * *